A. DARLING.
POST HOLE DIGGER.
APPLICATION FILED SEPT. 4, 1918.
1,286,547.
Patented Dec. 3, 1918.
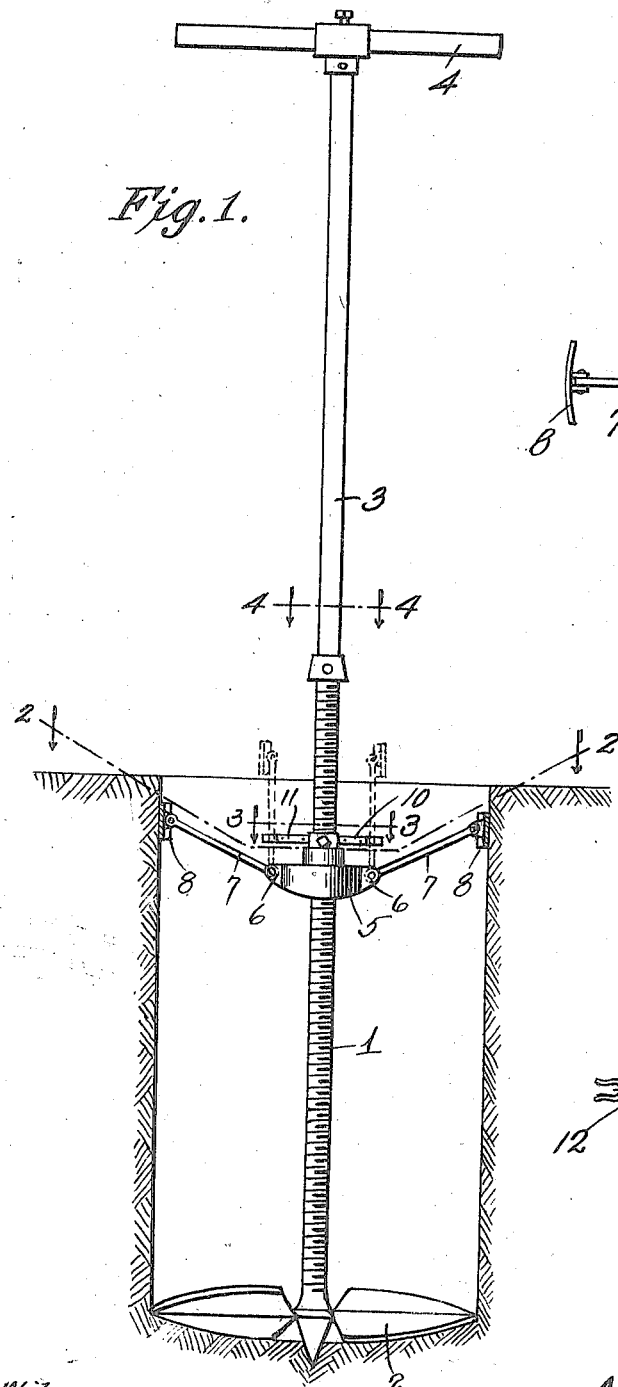
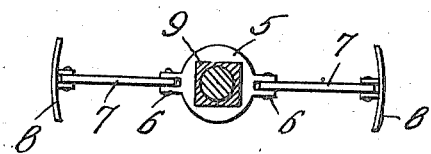
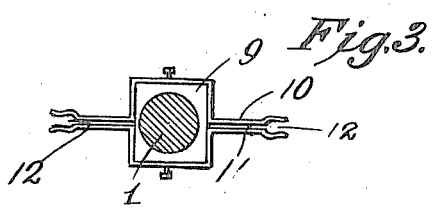
Witnesses
James F. Crown,
W. H. Mulligan
Inventor
Albert Darling,
By Richard B. Owen,
Attorney

UNITED STATES PATENT OFFICE.

ALBERT DARLING, OF MARIETTA, OKLAHOMA.

POST-HOLE DIGGER.

1,286,547.　　　　　Specification of Letters Patent.　　Patented Dec. 3, 1918.

Application filed September 4, 1918. Serial No. 252,591.

*To all whom it may concern:*

Be it known that I, ALBERT DARLING, a citizen of the United States, residing at Marietta, in the county of Love and State of Oklahoma, have invented certain new and useful Improvements in Post-Hole Diggers, of which the following is a specification.

This invention relates to post hole diggers, the primary object being to provide an implement for digging a hole to receive fence posts, telegraph poles and the like.

One of the objects of the invention is to provide a hand operated post hole digger operated by imparting a turning movement to an operating handle so that the cutting blade will follow into the ground and loosen the earth whereby it may be quickly removed for forming the hole.

Another object is to provide a device adapted to be held in a vertical position while in operation and provided with means adapted to engage the inner surface of the post hole for the purpose of maintaining the device in vertical position, thus assuring a straight hole.

A further object of the invention is to provide a device of this character which consists of comparatively few parts and is simple in construction, but durable and well adapted to withstand the rough usage to which devices of this character are ordinarily subjected.

For a full description of the invention and the advantages and merits thereof, reference is to be had to the following description and accompanying drawings, in which:—

Figure 1 is a side elevation of the device showing the same in operative position.

Fig. 2 is a section taken on the line 2—2 of Fig. 1.

Fig. 3 is a section taken on the line 3—3 of Fig. 1.

Fig. 4 is a section taken on the line 4—4 of Fig. 1.

Referring to the drawings, in which like characters of reference indicate corresponding parts throughout the several views, the shaft 1 is screw threaded throughout its length and is provided at one end with a cutting element 2 which may be in any preferred form and is adapted to cut into the soil and form the hole when the shaft 1 is turned. The upper end of the shaft carries a square extension 3 which may be of any desired length in order that a post hole of great depth may be formed if desired. The upper end of the extension 3 is provided with a right angularly extending handle bar 4 which may be grasped and rotated by the operator for the purpose of imparting a rotary motion to the shaft 1. Mounted upon the shaft 1 is a brace head 5 which has a central screw threaded opening to receive the shaft 1 and is provided with diametrically opposite ears 6 which receive arms 7 the ends of which are pivoted between the ears in each pair so that the arms are free to swing. The outer ends of these arms 7 carry shoes 8 which are adapted to engage the inner surface of the post hole as shown in Fig. 1 of the drawing. These arms are of a certain length so that they will extend at an angle upwardly when the device is in operative position whereby the shoes 8 will exert a binding action on the wall of the post hole. The arms 7, therefore, are governed in length by the diameter of the cutting element 2 and when the latter is changed to cut a hole of smaller size, the arms 7 are replaced by shorter or longer arms according to the diameter of the cutter. In this connection it should be pointed out that if the cutter is made smaller, it is not absolutely necessary to replace the arms 7 for the reason that they may be swung upwardly at a sharp angle to cause the shoes 8 to properly engage the wall of the post hole.

Extending upwardly from the top of the head 5 is a square portion 9 to which is attached the clamp members 10 and 11 which, when mounted in position form the yoke 12 adapted to receive the arms 7 when the same are swung upwardly to a vertical position as indicated by dotted lines in Fig. 1. By virtue of the extended arms of the clamps 10 and 11, the yoke members have a sufficient spring action to firmly engage the arms 7 when the latter are swung upwardly whereby they are held in the desired elevated position for permitting the device to be removed from the post hole.

In operation, the cutter will be extended into the ground by operating the handle 4 to impart a rotary motion to the shaft 1 for performing the cutting operation. The post hole after being started must be made perfectly straight and consequently the head 5 will be placed slightly below the ground level so that the shoes 8 will engage the sides of the hole. By firmly engaging the wall of the hole in this manner the head 5 will be held stationary so that the shaft 1 may be turned and the cutter by virtue of the screwed engagement of the shaft 1 with the head 5 will follow downwardly and cut into the earth to properly form the hole. The earth may then be readily removed to form the completed hole, the operator removing the device after the hole has been completed.

The foregoing description and accompanying drawings have reference to what might be considered to be the preferred or approved form of my invention. I desire it to be understood that I may make such changes in the construction, combination and arrangement of parts, materials, dimensions, et cetera, as may prove expedient and fall within the scope of the appended claims.

Having thus fully described my invention, what I claim as new and desire to secure by Letters Patent, is:—

1. A post hole digger comprising a screw threaded shaft having a cutting element at one end, a head provided with a central screw threaded opening to receive the shaft, and means mounted on the head to engage the inside of the post hole after the cutter has been inserted for a predetermined distance to brace the head for maintaining the said shaft in vertical position.

2. A post hole digger comprising a screw threaded shaft having a cutter at one end, a head mounted upon the shaft and having screw threaded engagement therewith, whereby the shaft may be turned to be extended through the head for causing the said cutter to follow into the ground, pivoted elements mounted on the head, and shoes mounted on the ends of the said pivoted elements to engage the sides of the hole to brace the head for maintaining the said shaft in vertical position.

3. A post hole digger comprising a screw threaded shaft having a cutter at one end, a head mounted upon the shaft and having screw threaded engagement therewith, whereby the shaft may be turned to be extended through the head for causing the said cutter to follow into the ground, pivoted elements mounted on the head, and shoes mounted on the ends of the said pivoted elements to engage the sides of the hole to brace the head for maintaining the said shaft in vertical position, the said head having clamp elements attached thereto disposed above the pivotal connections of the said elements with the head whereby the said elements may be held in operative position when the said cutter is removed from the hole.

4. A post hole digger comprising a rotary cutter adapted to extend vertically into the ground, and including a vertical shaft provided with stationary means for causing the said shaft to be longitudinally moved with respect to the said means when the shaft is turned, pivoted arms provided with shoes engaging the sides of the post hole to maintain the said means in vertical position with respect to the center of the cutter and to hold the said shaft in vertical position, and clamp elements adapted to receive the said pivoted arms to elevate the shoes for maintaining them in inoperative position when the said cutter is removed from the post hole.

In testimony whereof I affix my signature in presence of two witnesses.

ALBERT DARLING.

Witnesses:
B. W. JONES.
DEWEY HILL.

Copies of this patent may be obtained for five cents each, by addressing the "Commissioner of Patents, Washington, D. C."